United States Patent
Miyamae

(10) Patent No.: US 8,441,239 B2
(45) Date of Patent: May 14, 2013

(54) POWER SUPPLY CONTROLLER, ELECTRONIC DEVICE, AND METHOD FOR CONTROLLING POWER SUPPLY

(75) Inventor: Toru Miyamae, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 132 days.

(21) Appl. No.: 13/182,280

(22) Filed: Jul. 13, 2011

(65) Prior Publication Data

US 2012/0081085 A1    Apr. 5, 2012

(30) Foreign Application Priority Data

Oct. 5, 2010    (JP) .................................. 2010-225544

(51) Int. Cl.
*G05F 1/59*    (2006.01)
*G05F 1/40*    (2006.01)

(52) U.S. Cl.
USPC .......................................... 323/271; 323/282

(58) Field of Classification Search .................. 323/222, 323/271, 274, 282–285, 288, 351; 327/538, 327/542

See application file for complete search history.

(56) References Cited

U.S. PATENT DOCUMENTS

| | | | | |
|---|---|---|---|---|
| 5,731,694 A * | 3/1998 | Wilcox et al. | .................. | 323/287 |
| 6,292,378 B1 * | 9/2001 | Brooks et al. | .................. | 363/65 |
| 6,304,066 B1 * | 10/2001 | Wilcox et al. | .................. | 323/282 |
| 6,580,258 B2 * | 6/2003 | Wilcox et al. | .................. | 323/282 |
| 6,583,610 B2 * | 6/2003 | Groom et al. | .................. | 323/288 |
| 6,683,441 B2 * | 1/2004 | Schiff et al. | .................. | 323/222 |
| 6,828,766 B2 | 12/2004 | Corva et al. | | |
| 7,221,134 B1 | 5/2007 | Ling | | |
| 7,321,222 B2 * | 1/2008 | Hojo | .............................. | 323/224 |
| 7,453,251 B1 * | 11/2008 | Mehas et al. | .................. | 323/299 |
| 7,508,180 B2 * | 3/2009 | Chen et al. | .................... | 323/282 |
| 7,598,715 B1 * | 10/2009 | Hariman et al. | ............... | 323/271 |
| 7,764,053 B2 * | 7/2010 | Mehas et al. | .................. | 323/222 |
| 7,834,601 B2 * | 11/2010 | Aiura et al. | ..................... | 323/266 |
| 7,859,324 B2 * | 12/2010 | Yamashita et al. | ............. | 327/540 |
| 7,990,120 B2 * | 8/2011 | Leonard et al. | ............... | 323/282 |
| 8,106,634 B2 * | 1/2012 | Hojo et al. | ..................... | 323/222 |
| 8,299,764 B2 * | 10/2012 | Laur et al. | ...................... | 323/224 |
| 2002/0125872 A1 * | 9/2002 | Groom et al. | .................. | 323/288 |
| 2005/0194951 A1 * | 9/2005 | Mehas et al. | .................. | 323/282 |
| 2005/0286269 A1 | 12/2005 | Groom | | |
| 2006/0022658 A1 * | 2/2006 | Harriman et al. | ............. | 323/284 |
| 2007/0120547 A1 | 5/2007 | Tateishi et al. | | |

(Continued)

FOREIGN PATENT DOCUMENTS

| | | |
|---|---|---|
| JP | 2010-35316 A | 2/2010 |
| WO | WO 2005/046036 A1 | 5/2005 |

*Primary Examiner* — Adolf Berhane
(74) *Attorney, Agent, or Firm* — Arent Fox LLP

(57) ABSTRACT

A comparator type power supply controller that controls an output voltage. The power supply controller includes a comparator that compares a feedback voltage, which corresponds to the output voltage, with a reference voltage, wherein the comparator instructs power supply when the feedback voltage decreases when the feedback voltage decreases from the reference voltage. An offset application circuit is coupled to the comparator. The offset application circuit controls an input offset voltage of the comparator and decreases the input offset voltage as time elapses when the feedback voltage becomes lower than the reference voltage after the power supply ends. An amplifier amplifies a voltage difference of the feedback voltage and the reference voltage. The offset application circuit increases a change speed of the input offset voltage as the voltage difference increases in accordance with an output voltage of the amplifier.

9 Claims, 8 Drawing Sheets

U.S. PATENT DOCUMENTS

| | | |
|---|---|---|
| 2008/0019160 A1 | 1/2008 | Umemoto et al. |
| 2008/0088284 A1* | 4/2008 | Weng ........................... 323/271 |
| 2008/0303492 A1* | 12/2008 | Aiura et al. .................. 323/270 |
| 2009/0015217 A1* | 1/2009 | Harriman ...................... 323/266 |
| 2010/0019749 A1 | 1/2010 | Katsuya et al. |
| 2010/0072964 A1* | 3/2010 | Qiu et al. ...................... 323/282 |
| 2010/0283440 A1 | 11/2010 | Futamura |
| 2011/0062926 A1* | 3/2011 | Qiu et al. ...................... 323/282 |
| 2011/0127985 A1* | 6/2011 | Tsai et al. ..................... 323/285 |
| 2011/0241636 A1* | 10/2011 | Wu et al. ....................... 323/272 |
| 2011/0260703 A1* | 10/2011 | Laur et al. ..................... 323/271 |
| 2012/0091981 A1* | 4/2012 | Komiya ........................ 323/282 |
| 2012/0126772 A1* | 5/2012 | Yamakoshi et al. .......... 323/284 |
| 2012/0146609 A1* | 6/2012 | Seki .............................. 323/284 |
| 2012/0217941 A1* | 8/2012 | Chen et al. .................... 323/271 |
| 2012/0274301 A1* | 11/2012 | Nakashima ................... 323/284 |

* cited by examiner (1) $Vfb > Vref \longrightarrow td1$
$t1 > t0 \longrightarrow Vout \searrow$
$Vfb \searrow$ (2) $Vfb > Vref \longrightarrow td2$
$t2 < t0 \longrightarrow Vout \nearrow$
$Vfb \nearrow$ td0: Set Value When Vref=Vfb is Satisfied (1) Vfb>Vref ⟶ Vc1
    t1>t0 ⟶ Vout ↘
           Vfb ↘

(2) Vfb>Vref ⟶ Vc2
    t2<t0 ⟶ Vout ↗
           Vfb ↗

Vc0: Set Value When Vref=Vfb is Satisfied (1) Vfb>Vref
   t1>t0 ⟶ Vout ↗
           Vfb ↗

(2) Vfb>Vref
   t2<t0 ⟶ Vout ↘
           Vfb ↘

Vamp0: Set Value When Vref=Vfb is Satisfied

US 8,441,239 B2

POWER SUPPLY CONTROLLER, ELECTRONIC DEVICE, AND METHOD FOR CONTROLLING POWER SUPPLY

CROSS-REFERENCE TO RELATED APPLICATIONS

This application is based upon and claims the benefit of priority from prior Japanese Patent Application No. 2010-225544, filed on Oct. 5, 2010, the entire contents of which are incorporated herein by reference.

FIELD

The present invention relates to a comparator type power supply controller, electronic device, and a method for controlling a power supply control.

BACKGROUND

To improve responsiveness to a sudden load variation, a known switching power supply device amplifies a ripple component of a feedback voltage and controls an output based on a comparison between a ripple component of an amplified output and a reference voltage (refer to Japanese Laid-Open Patent Publication No. 2010-35316).

In another switching power supply device, current is supplied to a node to which a reference voltage is applied via a resistor. This adds a slope voltage to the reference voltage. An output voltage is controlled by inputting the added voltage and a feedback voltage to a comparator (refer to US 2005/00286269).

However, in a comparator type switching power supply device, when control is executed so that a lower limit of a feedback voltage becomes equal to a reference voltage, the feedback voltage includes a ripple component corresponding to the output voltage. Thus, the control is executed so that the reference voltage becomes equal to a lower limit of the ripple. The ripple component changes depending on operational conditions including circuit parameters such as an inductance value of a coil, input/output voltage, and transmission frequency. Accordingly, the ripple component of the output voltage shifts the average value of the output voltage, and accuracy of the output voltage may not be obtained.

When current flows to a node to which a reference voltage is applied, it may be necessary to arrange a buffer circuit having a low input impedance in a generation source of the reference voltage to keep the reference voltage constant. However, due to offset variations in the buffer circuit, the output reference voltage value may be deviated from the input voltage value. It may thus be difficult to obtain an accurate output voltage.

SUMMARY

One aspect of the present invention is a comparator type power supply controller that controls an output voltage. The power supply controller includes a comparator that compares a feedback voltage, which corresponds to the output voltage, with a reference voltage and instructs power supply when the feedback voltage decreases from the reference voltage. An offset application circuit is coupled to the comparator to control an input offset voltage of the comparator. The offset application circuit decreases the input offset voltage as time elapses when the feedback voltage becomes lower than the reference voltage after the power supply ends. An amplifier amplifies a voltage difference of the feedback voltage and the reference voltage. The offset application circuit increases a change speed of the input offset voltage as the voltage difference increases in accordance with an output voltage of the amplifier.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF EMBODIMENTS

A switching power supply device according to embodiments will be discussed. A comparator type switching power supply device is one example of the switching power supply device capable of coping with a sudden load variation. The comparator type switching power supply device receives a feedback voltage generated by dividing an output voltage of the switching power supply device and controls a power supply by performing a switching operation when the feedback voltage is decreased or increased from a reference voltage.

Figure 1:
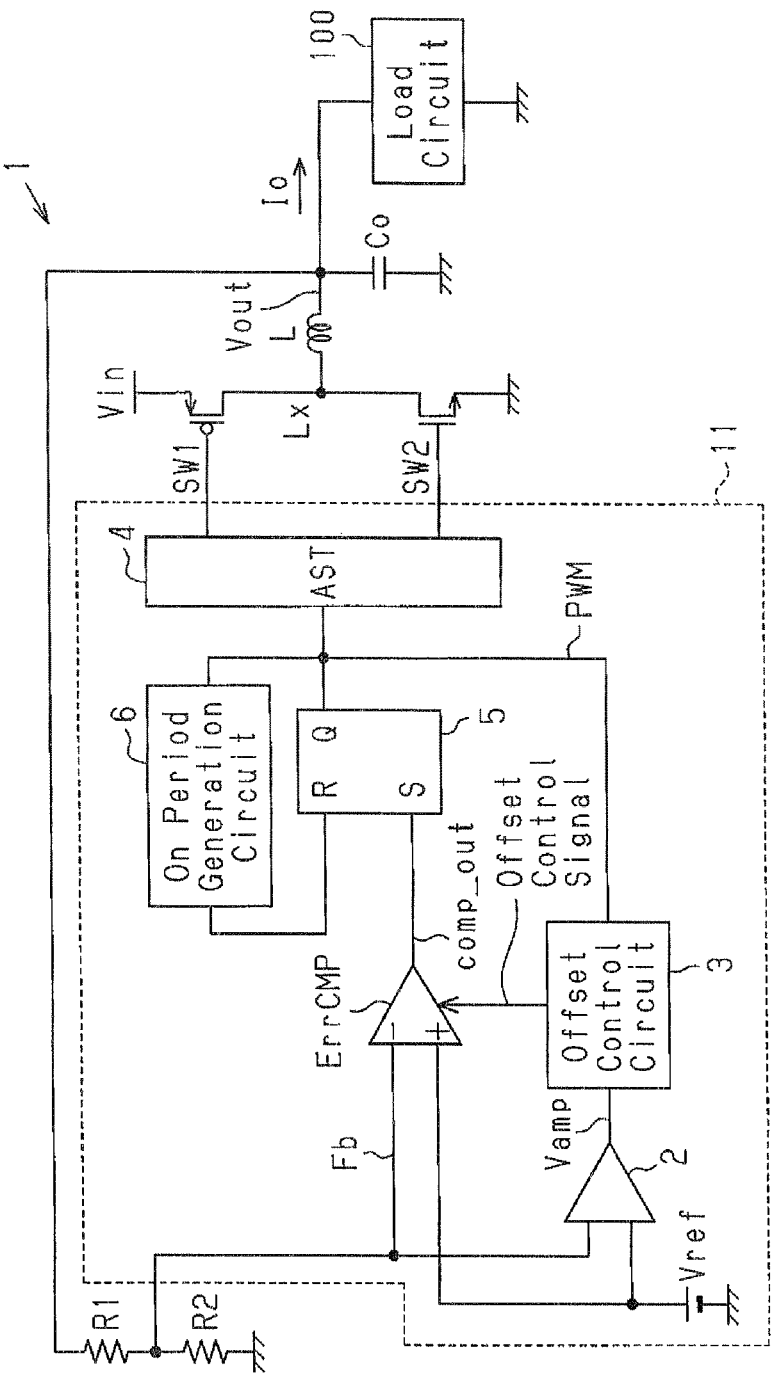
FIG. 1 is a block diagram of a switching power supply device common to various embodiments of the present disclosure.

FIG. 1 is a block diagram of a switching power supply device 1, which is commonly shared by the embodiments described later.

The switching power supply device 1 includes a switch SW1, a switch SW2, a resistor R1, a resistor R2, an inductor L, a capacitor Co, and a switching power supply control circuit 11. The switching power supply control circuit 11 controls the switches SW1 and SW2 and includes a comparator ErrCMP, an offset control amplifier 2, an offset control circuit 3, an anti-shoot-through (AST) circuit 4, an RS flip-flop 5, and an on period generation circuit 6.

One end of the switch SW1 is coupled to an input voltage Vin, the other end of the switch SW1 is coupled to a terminal Lx of the inductor L and to one end of the switch SW2. The other end of the switch SW2 is coupled to a ground potential. The AST circuit 4 controls the switches SW1 and SW2 according to a control signal PWM. The AST circuit 4 is a driver that operates the switches SW1 and SW2 and functions to prevent the switches SW1 and SW2 from being short-circuited in which they become conductive at the same time.

The inductor L is coupled to the terminal Lx and one end of the capacitor Co. The other end of the capacitor Co is coupled to the ground potential. A voltage generated at a connection terminal of the inductor L and the capacitor Co is an output voltage Vout of the switching power supply device 1. The output voltage Vout is applied to a load circuit 100.

The resistors R1 and R2 are coupled in series between the output voltage Vout and the ground potential. The resistor R1 is coupled between the output voltage Vout and a node Fb, and the resistor R2 is coupled between the node Fb and the ground potential. A voltage at the node Fb between the resistors R1 and R2 is referred to as a feedback voltage Vfb.

A frequency band of the offset control amplifier 2 is sufficiently lower than a switching frequency of the switching power supply device 1. Accordingly, the offset control amplifier 2 does not follow a ripple of the feedback voltage Vfb and responds to an averaged voltage value of the feedback voltage Vfb. That is, the offset control amplifier 2 receives the feedback voltage Vfb and a reference voltage Vref and outputs a control signal Vamp, which is an amplification signal of a difference between the averaged feedback voltage Vfb of a direct current component and the reference voltage Vref to the offset control circuit 3. A state in which the feedback voltage Vfb is equal to the reference voltage Vref is referred to as an equilibrium state.

The offset control circuit 3 receives the control signal PWM and the control signal Vamp and outputs an offset control signal to the comparator ErrCMP.

The feedback voltage Vfb is input to an inverting input terminal of the comparator ErrCMP, and the reference voltage Vref is input to a non-inverting input terminal of the comparator ErrCMP. An output signal, namely, a control signal comp_out, of the comparator ErrCMP is output to a set terminal S of the RS flip-flop 5. The RS flip-flop 5 outputs the control signal PWM.

The control signal PWM output from the RS flip-flop 5 is input to the on period generation circuit 6. The on period generation circuit 6 determines an on period Ton of the switch SW1. The on period generation circuit 6 outputs a reset signal to a reset terminal R of the RS flip-flop 5. The RS flip-flop 5 is set in accordance with the output signal (control signal comp_out) of the comparator ErrCMP, When the control signal PWM shifts to a high level, the on period generation circuit 6 resets the RS flip-flop 5 after the on period Ton elapses, thereby setting the control signal PWM to a low level.

Figure 2:
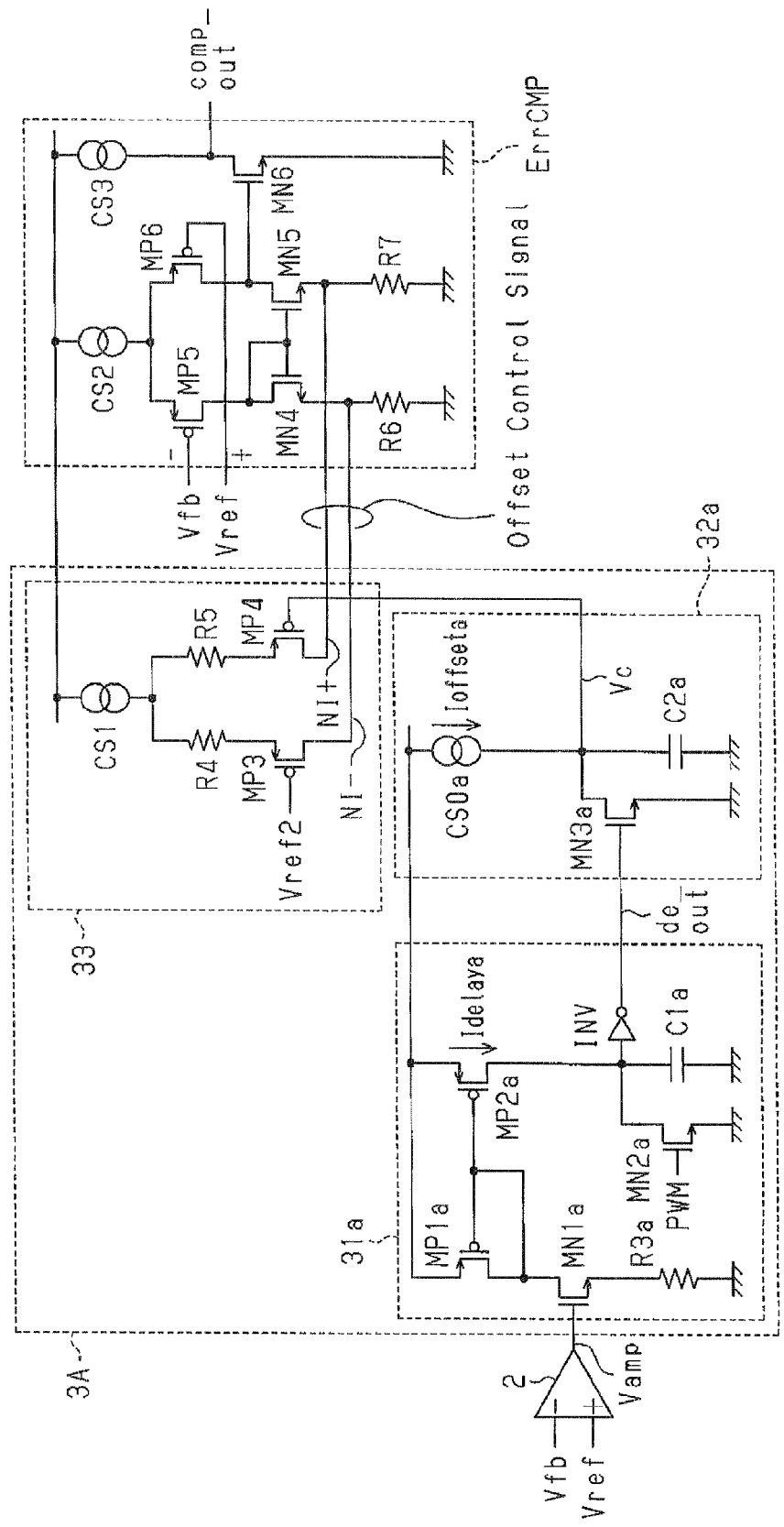
FIG. 2 is a circuit diagram of an offset control circuit 3A and a comparator ErrCMP according to a first embodiment.

The switching power supply control circuit 11 of the first embodiment will now be described with reference to FIG. 2. An offset control circuit 3A and a comparator ErrCMP of FIG. 2 are examples of the offset control circuit 3 and the comparator ErrCMP of FIG. 1.

The offset control circuit 3A includes a delay generation unit 31a, a slope generation unit 32a, and a differential pair unit 33.

In the delay generation unit 31a, the control signal Vamp output from the offset control amplifier 2 is input to the gate terminal of an nMOS transistor MN1a. The control signal Vamp is a control signal corresponding to the difference between the average value of the feedback voltage Vfb and the reference voltage Vref. The offset control amplifier 2 outputs the control signal Vamp according to the feedback voltage Vfb input to the inverting input terminal and the reference voltage Vref input to the non-inverting input terminal.

A resistor R3a is coupled between the source terminal of the nMOS transistor MN1a and the ground potential. A drain terminal of the nMOS transistor MN1a is coupled to the gate terminal and the drain terminal of a pMOS transistor MP1a. The gate terminal of the pMOS transistor MP1a is coupled to the gate terminal of a pMOS transistor MP2a. The pMOS transistor MP1a and the pMOS transistor MP2a configure a current mirror circuit. The pMOS transistor MP2a supplies a capacitor C1a with a charge current Idelaya, which has the same value as a current flowing to the nMOS transistor MN1a or a certain multiplied value of the current flowing to the nMOS transistor MN1a.

An end of the capacitor C1a is coupled to the drain terminal of the pMOS transistor MP2a, the drain terminal of an nMOS transistor MN2a, and an input terminal of an inverter INV. The other end of the capacitor C1a is coupled to the ground potential. A source terminal of the nMOS transistor MN2a is coupled to the ground potential. A gate terminal of the nMOS transistor MN2a receives the control signal PWM. Thus, the control signal PWM switches the charge and discharging of the capacitor C1a. For example, during a period in which the control signal PWM shifts to a high level, the capacitor C1a is discharged via the nMOS transistor MN2a. During a period in which the control signal PWM shifts to a low level, the capacitor C1a is charged with the charge current Idelaya. As a result, during the period in which the control signal PWM shifts to a high level, the inverter INV sets a control signal de_out to be output at a high level. In contrast, during the period in which the control signal PWM shifts to a low level, the capacitor C1a is charged with the charge current Idelaya, and a voltage of the input terminal of the inverter INV coupled with the capacitor C1a increases. When the input voltage increases from an inverting threshold value of the inverter INV, the inverter INV switches the control signal de_out from the high level to a low level.

Figure 3:
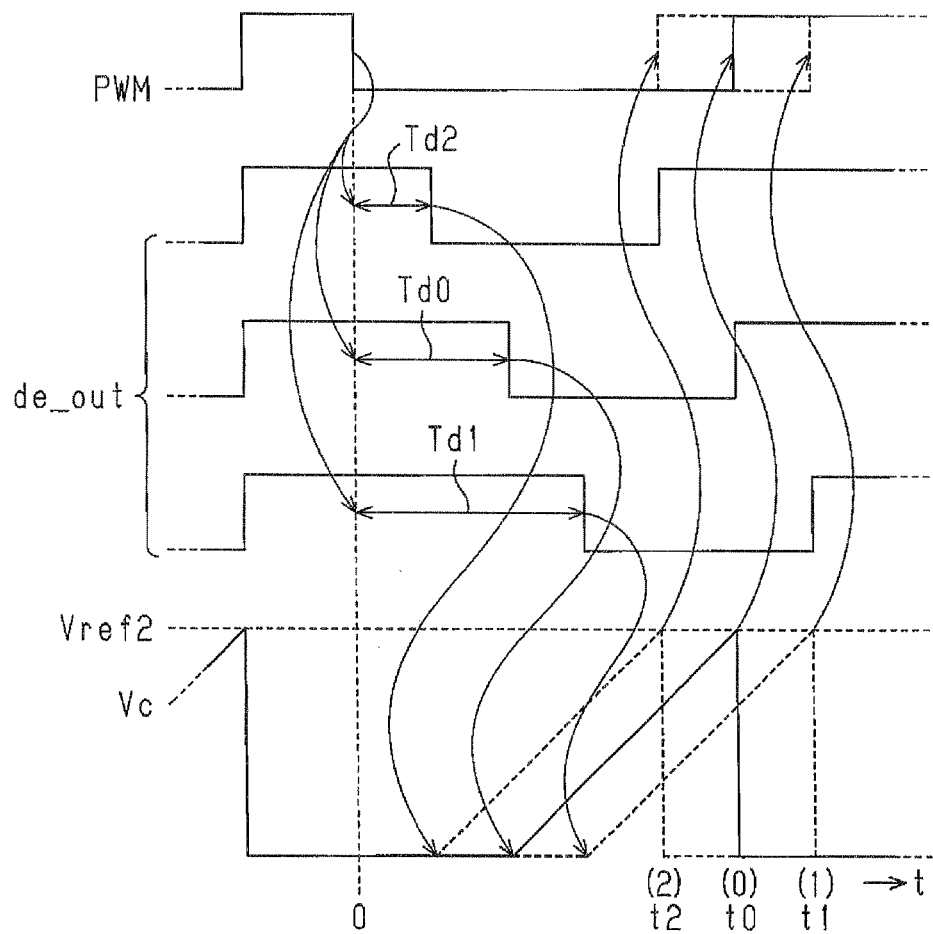
FIG. 3 is a diagram illustrating a control of a comparator ErrCMP by an offset control amplifier 2 and the offset control circuit 3A according to the first embodiment.

A period from when the low level control signal PWM is input to the delay generation unit 31a to when the control signal de_out shifts to the low level is a delay time generated by the delay generation unit 31a (refer to td0, td1, td2 of FIG. 3). The delay time is determined according to a voltage of the control signal Vamp, which is an output signal of the offset control amplifier 2.

When the feedback voltage Vfb is greater than the reference voltage Vref, as the voltage difference between the feedback voltage Vfb and the reference voltage Vref increases, the voltage of the control signal Vamp decreases. Thus, a higher voltage of the control signal Vamp decreases a current of the charge current Idelaya. A decrease in the charge current Idelaya decreases a charge speed of the capacitor C1a and increases the time until an input voltage of the inverter INV rises from the inverting threshold value. That is, when the feedback voltage Vfb is greater than the reference voltage Vref, the delay time generated by the delay generation unit 31a becomes longer than when the feedback voltage Vfb and the reference voltage Vref are in the equilibrium state.

When the feedback voltage Vfb is lower than the reference voltage Vref, a larger voltage difference between the feedback voltage Vfb and the reference voltage Vref increases the voltage of the control signal Vamp. As a result, a lower voltage of the control signal Vamp increases the current of the charge current Idelaya. An increase in the charge current Idelaya increases the charge speed of the capacitor C1a. This shortens the time until the input voltage of the inverter INV increases from the inverting threshold value. That is, the delay time generated by the delay generation unit 31a is reduced when the feedback voltage Vfb is lower than the reference voltage Vref.

The slope generation unit 32a includes a capacitor C2a, a constant current source CS0a, and an nMOS transistor MN3a. The source terminal of the nMOS transistor MN3a is coupled to the ground potential, the drain terminal of the nMOS transistor MN3a is coupled to the capacitor C2a and to the gate terminal of a pMOS transistor MP4 of the differential pair unit 33, which will be described later. The gate terminal of the nMOS transistor MN3a receives the control signal de_out from the delay generation unit 31a. The nMOS transistor MN3a switches charging and discharging of the capacitor C2a according to the control signal de_out.

One end of the capacitor C2a is coupled to the ground potential. The other end of the capacitor C2a is coupled to the constant current source CS0a, the gate terminal of a pMOS transistor MP4a, and the drain terminal of the nMOS transistor MN3a. The voltage generated at a terminal of the capacitor C2a coupled in this manner is referred to as a slope voltage Vc. The capacitor C2a is discharged during the period in which the control signal de_out shifts to a high level. This initializes the slope voltage Vc. The capacitor C2a is charged with a charge current Ioffseta by the constant current source CS0a during the period in which the control signal de_out shifts to a low level. The slope voltage Vc increases at a speed corresponding to a current amount of the charge current Ioffseta.

The differential pair unit 33 includes a constant current source CS1, a resistor R4, a resistor R5, a pMOS transistor MP3, and the pMOS transistor MP4. The source terminal of the pMOS transistor MP3 is coupled to the constant current source CS1 via the resistor R4, the gate terminal of the pMOS transistor MP3 receives a reference voltage Vref2, and the drain terminal thereof is coupled to a node NI−. The source terminal of the pMOS transistor MP4 is coupled to the constant current source CS1 via the resistor R5, the gate terminal of the pMOS transistor MP4 receives the slope voltage Vc, and the drain terminal is coupled to a node NI+. The differential pair unit 33 supplies an offset control current Io+ and an offset control current Io− to the comparator ErrCMP via the node NI+ and the node NI−. The offset control currents Io+ and Io− are examples of the offset control signal.

A state in which the pMOS transistors MP3 and MP4 have the same current capacity, the resistors R4 and R5 have the equal resistance value, and the reference voltage Vref2 is equal to the slope voltage Vc is referred to as a base state of the differential pair unit 33. When the differential pair unit 33 is in the base state, the node NI+ and the node NI− have the same current. That is, the offset control current Io+ and the offset control current Io− have the same current value. When the slope voltage Vc is lower than when the differential pair unit 33 is in the base state, the node NI+ supplies more current than that of the node NI− to the comparator ErrCMP. That is, the offset control current Io+ becomes a current value greater than the offset control current Io−. Further, when the slope voltage Vc is greater than when the differential pair unit 33 is in the base state, the node NI+ supplies less current than that of the node NI− to the comparator ErrCMP. That is, the offset control current Io+ becomes a current value lower than the offset control current Io−.

When the slope voltage Vc is lower than the reference voltage Vref2, a lower slope voltage Vc increases the current value of the offset control current Io+ from the current value of the offset control current Io−. As the delay time ends and the slope voltage Vc increases, the offset control current Io+ decreases and the offset control current Io− increases.

The comparator ErrCMP includes a constant current source CS2, a constant current source CS3, a pMOS transistor MP5, a pMOS transistor MP6, an nMOS transistor MN4, an nMOS transistor MN5, an nMOS transistor MN6, a resistor R6, and a resistor R7.

A gate terminal of the pMOS transistor MP5 is the inverting input terminal of the comparator ErrCMP. The gate terminal of the pMOS transistor MP5 receives the feedback voltage Vfb, and the source terminal of the pMOS transistor MP5 is coupled to the constant current source CS2. A gate terminal of the pMOS transistor MP6 is a non-inverting input terminal of the comparator ErrCMP. The gate terminal of the pMOS transistor MP6 receives the reference voltage Vref, and the source terminal of pMOS transistor MP6 is coupled to the constant current source CS2.

The drain terminal and the gate terminal of the nMOS transistor MN4 are coupled to the drain terminal of the pMOS transistor MP5. The source terminal of the nMOS transistor MN4 is coupled to the node NI− and coupled to the ground potential via the resistor R6. The gate terminal of the nMOS transistor MN5 is coupled to the drain terminal of the pMOS transistor MP6. The nMOS transistor MN5 forms a current mirror circuit by sharing the gate terminal with the nMOS transistor MN4. A drain terminal of the nMOS transistor MN5 is coupled to the drain terminal of the pMOS transistor MP6, and the source terminal of the nMOS transistor MN5 is coupled to the node NI+ and to the ground potential via the resistor R7.

The gate terminal of the nMOS transistor MN6 is coupled to the drain terminal of the pMOS transistor MP6 and the drain terminal of the nMOS transistor MN5. The source terminal of the nMOS transistor MN6 is coupled to the ground potential, and the drain terminal is coupled to the constant current source CS3. The control signal comp_out, which is a drain voltage of the pMOS transistor MP6, is output from the comparator ErrCMP.

An input offset voltage of the comparator ErrCMP is controlled by the offset control current Io+ and the offset control current Io−, which flow from the node NI+ and the node NI− to the comparator ErrCMP.

In the equilibrium state (i.e., Vfb=Vref), it is assumed here that the pMOS transistors MP5 and MP6 of the comparator ErrCMP have the same current capability, the nMOS transistors MN4 and MN5 have the same current capacity, and the resistors R6 and R7 have the same resistance value. First, a case in which the slope voltage Vc is lower than the reference voltage Vref2 will be discussed. In this case, the offset control current Io+ is greater than the offset control current Io−. In comparison with when the offset control current Io+ is equal to the offset control current Io−, a current flowing to the resistor R7 of the comparator ErrCMP is greater than a current flowing to the resistor R6. As a result, a terminal voltage of the resistor R7 is greater than a terminal voltage of the resistor R6, and a voltage between the source and the drain of the nMOS transistor MN5 is less than a voltage between the source and the drain of the nMOS transistor MN4. Accordingly, in comparison with the nMOS transistor MN4, a current which can be discharged by the nMOS transistor MN5 is decreased. That is, when the feedback voltage Vfb is equal to the reference voltage Vref and the same amount of current is supplied from the pMOS transistor MP5 and the pMOS transistor MP6 to the nMOS transistor MN4 and the nMOS transistor MN5, the current that can be discharged by the nMOS transistor MN5 is less than that which can be discharged from the nMOS transistor MN4. As a result, the drain terminal voltage of the nMOS transistor MN5 becomes greater than the drain terminal voltage of the nMOS transistor MN4. Therefore, when the same voltage is applied to the gate terminals of the pMOS transistor MP5 and pMOS transistor MP6 of the comparator ErrCMP, the output control signal comp_out is shifted to a low level. In a state that the feedback voltage Vfb is equal to the reference voltage Vref, the control signal comp_out, which is an output signal of the comparator ErrCMP, is not inverted. To invert the control signal comp_out to the high level, it is necessary that the feedback voltage Vfb be less than the reference voltage Vref by at least a certain voltage. The certain voltage is the input offset voltage of the comparator ErrCMP. An input offset voltage of when the feedback voltage Vfb is lower than the reference voltage Vref and the control signal comp_out is inverted is referred to as a negative input offset voltage.

Next, a case in which the slope voltage Vc is greater than the reference voltage Vref2 in the equilibrium state will be discussed. In this case, the offset control current Io+ is lower than the offset control current Io−. In comparison with when the offset control current Io+ is equal to the offset control current Io−, a current flowing to the resistor R7 of the comparator ErrCMP is less than a current flowing to the resistor R6. As a result, the terminal voltage of the resistor R7 is less than the terminal voltage of the resistor R6, and the voltage between the source and the drain of the nMOS transistor MN5 is greater than the voltage between the source and the drain of the nMOS transistor MN4. Accordingly, in comparison with the nMOS transistor MN4, the current that can be discharged by the nMOS transistor MN5 is increased. That is, when the feedback voltage Vfb is equal to the reference voltage Vref and the same amount of current is supplied from the pMOS transistor MP5 and pMOS transistor MP6 to the nMOS transistor MN4 and nMOS transistor MN5, the current that can be discharged by the nMOS transistor MN5 is larger than that discharged by the nMOS transistor MN4. As a result, the drain terminal voltage of the nMOS transistor MN5 becomes lower than the drain terminal voltage of the nMOS transistor MN4. Therefore, when the same voltage is applied to the gate terminals of the pMOS transistor MP5 and pMOS transistor MP6 of the comparator ErrCMP, the output control signal comp_out shifts to a high level. In a state in which the feedback voltage Vfb is equal to the reference voltage Vref, the control signal comp_out, which is the output signal of the comparator ErrCMP, is not inverted. To invert the control signal comp_out to the low level, it is necessary that the feedback voltage Vfb be greater than the reference voltage Vref at least by a certain voltage. The certain voltage is the input offset voltage. The input offset voltage when the feedback voltage Vfb is greater than the reference voltage Vref and the control signal comp_out is inverted is referred to as a positive input offset voltage.

When the slope voltage Vc is lower than the reference voltage Vref2, as the slope voltage Vc increases, the offset control current Io+ decrease, and the offset control current Io increases. This decrease the negative input offset voltage of the comparator ErrCMP. When the slope voltage Vc becomes equal to the reference voltage Vref2, a current amount of the offset control current Io+ becomes equal to a current amount of the offset control current Io−. As a result, the input offset voltage of the comparator ErrCMP becomes zero. When the slope voltage Vc is greater than the reference voltage Vref2, as the slope voltage Vc increases, the offset control current Io+ increases, and the offset control current Io− decreases. That is, the positive input offset voltage of the comparator ErrCMP increases.

The comparator ErrCMP compares the feedback voltage Vfb with a voltage obtained by subtracting the negative input offset voltage from the reference voltage Vref or with a voltage obtained by adding the positive input offset voltage to the reference voltage Vref. When a voltage value of the feedback voltage Vfb becomes lower, the control signal comp_out output by the comparator ErrCMP is switched from the low level to the high level.

FIG. 3 illustrates a control executed on the comparator ErrCMP by the offset control amplifier 2 and the offset control circuit 3A of the first embodiment. When the control signal PWM shifts to the high level, the switch SW1 becomes conductive, the switch SW2 becomes non-conductive, and the switching power supply device 1 supplies power during the on period Ton generated by the on period generation circuit 6. Next, when the control signal PWM shifts to the low level, the switch SW1 becomes non-conductive and the switch SW2 becomes conductive. Next, when the control signal PWM shifts to the high level, the switch SW1 becomes conductive, the switch SW2 becomes non-conductive, and the switching power supply device 1 supplies power. This cycle is repeated.

The offset control amplifier 2 is an error amplifier for amplifying a voltage difference between the reference potential Vref and the feedback voltage Vfb. In general, the error amplifier is provided with a phase compensation circuit and the like. Thus, the band of an input/output response is restricted. The same applies to the offset control amplifier 2. Normally, the band of the offset control amplifier 2 is lower than a switching frequency of the switching power supply device 1. As a result, in the offset control amplifier 2, the feedback voltage Vfb is smoothed by a switching operation of the switching power supply device 1, and the average value of the feedback voltage Vfb (ripple voltage) is error-amplified. It is considered that an input/output response of the offset control amplifier 2 is for the average value of the feedback voltage Vfb.

When the average value of the feedback voltage Vfb is greater than the reference voltage Vref, a larger voltage difference between the average value of the feedback voltage Vfb and the reference voltage Vref decreases a voltage of the control signal Vamp output from the offset control amplifier 2.

Here, the control signal Vamp is input to the gate terminal of the nMOS transistor MN1a in the delay generation unit 31a. Due to transconductance of the nMOS transistor MN1a, a lower voltage of the control signal Vamp decreases the current between the source and the drain of the nMOS transistor MN1a. This decreases the current flowing to the nMOS transistor MN1a and the pMOS transistor MP1a. This also increases the voltage generated at the drain terminals of the nMOS transistor MN1a and the pMOS transistor MP1a, which are coupled to the gate terminal of the pMOS transistor MP1a. Accordingly, the voltage input to the gate terminal of the pMOS transistor MP2a, which is coupled to the pMOS transistor MP1a, increases. This decreases the current amount of the charge current Idelaya, which is the current between the source and the drain from the pMOS transistor MP2a. The decrease in the charge current to the capacitor C1a increases the time until an input terminal voltage of the inverter INV exceeds the inverting threshold value of the inverter INV. In FIG. 3, a period from when the control signal PWM shifts to the low level and charging of the capacitor C1a with the charge current Idelaya starts to when the control signal de_out shifts to the low level is defined as a delay period (td2, td0, td1). In this case, an increase in the average value of the feedback voltage Vfb from the reference voltage Vref increases the delay period. As a result, an increase in the average value of the feedback voltage Vfb from the reference voltage Vref prolongs the off period. Here, compare the period from time 0 to time t0 with the period from time 0 to time t1 in FIG. 3.

In this manner, the on period generated by the on period generation circuit 6 is fixed. Thus, a longer off period decreases an on-duty. In a step-down type switching power supply device, the multiplication result of the on-duty value and the input voltage Vin becomes equal to an average value of the output voltage Vout. Accordingly, a longer off period decreases the average value of the output voltage Vout. This decreases the feedback voltage Vfb.

Next, when the average value of the feedback voltage Vfb is lower than the reference voltage Vref, a larger voltage difference between the average value of the feedback voltage Vfb and the reference voltage Vref increases the voltage of the control signal Vamp output from the offset control amplifier 2.

Here, the control signal Vamp is input to the gate terminal of nMOS transistor MN1a of the delay generation unit 31a. Due to the transconductance of the nMOS transistor MN1a, a higher voltage of the control signal Vamp increases the current between the source and the drain of the nMOS transistor MN1a. This increases the current flowing to the nMOS transistor MN1a and the pMOS transistor MP1a. This also increases the voltage generated at the drain terminals of the nMOS transistor MN1a and the pMOS transistor MP1a, which are coupled to the gate terminal of the pMOS transistor MP1a. Accordingly, the voltage input to the gate terminal of the pMOS transistor MP2a, which is coupled to the gate terminal with the pMOS transistor MP1a, decreases. Thus, the current amount of the charge current Idelaya, which is the current between the source and the drain flowing from the pMOS transistor MP2a increases. The increase in the charge current Idelaya to the capacitor C1a shortens the time until the input terminal voltage of the inverter INV exceeds the inverting threshold value of the inverter INV. In FIG. 3, the period from when the control signal PWM shifts to the low level and charging of the capacitor C1a by the charge current Idelaya is started to when the control signal de_out shifts to the low level is defined as a delay period. In this case, as the average value of the feedback voltage Vfb decreases from the reference voltage Vref, the delay period is shortened. As a result, a decrease in the average value of the feedback voltage Vfb from the reference voltage Vref shortens the off period. Here, compare the period from time 0 to time t0 with the period from time 0 to time t2 in FIG. 3.

Due to the on period generation circuit 6, the on period is fixed. This shortens the off period and increases the on-duty. The shortened off period increases the output voltage Vout. This increases the average value of the feedback voltage Vfb.

In this manner, the feedback voltage Vfb and the reference voltage Vref are input to the comparator ErrCMP. When the feedback voltage Vfb becomes lower than any one of a value obtained by subtracting the negative input offset voltage, which decreases as time elapses, from the reference voltage Vref, the reference voltage Vref, and a value obtained by adding the input offset voltage, which increases as time elapses, to the reference voltage Vref, the control signal comp_out, which is the output signal of the comparator ErrCMP, is shifted from the low level to the high level. Then, the control signal PWM shifts to the high level and a switching cycle of the switching power supply device starts. Further, the on period starts. During the on period, the switch SW1 becomes conductive, and the switch SW2 becomes non-conductive. Then, the control signal PWM shifts to the low level, the on period ends, and the off period starts. During the on period, when the feedback voltage Vfb becomes lower than any one of the values obtained by subtracting the negative input offset voltage which decreases as time elapses, from the reference voltage Vref, the reference voltage Vref, and the value obtained by adding the input offset voltage, which increases as time elapses, to the reference voltage Vref, the control signal comp_out, which is the output signal of the comparator ErrCMP is shifted again from the low level to the high level. That is, the control signal PWM shifts to the high level, and the next switching cycle of the switching power supply device 1 starts. In this manner, the switching cycle of the switching power supply device 1 is repeated. The feedback voltage Vfb is compared with the voltage obtained by applying the negative input offset voltage or the positive input offset voltage, which changes as time elapses, to the reference voltage Vref. Thus, an offset change speed is reflected to the comparison result of the comparator ErrCMP. Even when the variation in the feedback voltage Vfb caused by the ripple voltage of the output voltage Vout is small, the comparison is performed by emphasizing a periodic change of the voltage. As a result, the response of the comparator ErrCMP becomes quick, and high speed response is ensured for the comparator type switching power supply device 1.

Further, the feedback voltage Vfb and the reference voltage Vref are input to the offset control amplifier 2. The offset control amplifier 2 outputs the control signal Vamp corresponding to the difference between the average value of the feedback voltage Vfb and the reference voltage Vref. The control signal Vamp is input to the delay generation unit 31a and controls the period until the control signal de_out shifts to the low level after the control signal PWM shifts to the low level. As the feedback voltage Vfb increases from the reference voltage Vref, the voltage of the control signal Vamp decreases. This decreases the charge current Idelaya to the capacitor C1a. As a result, the delay period until the control signal de_out shifts to the low level is prolonged. In contrast, as the feedback voltage Vfb decreases from the reference voltage Vref, the voltage of the control signal Vamp increases. This increases the charge current Idelaya to the capacitor C1a. As a result, the delay period until the control signal de_out shifts to the low level is shortened. After the control signal PWM shifts to the low level, when the feedback voltage Vfb becomes lower any one of the value obtained by subtracting the negative input offset voltage, which decreases as time elapses, from the reference voltage Vref, the reference voltage Vref, and the value obtained by adding the positive input offset voltage, which increases as time elapses, to the reference voltage Vref, the control signal comp_out, which is the output signal of the comparator ErrCMP, is switched from the low level to the high level. Then, a period in which the control signal PWM shifts to the high level is set as the off period. A longer off period decreases the on-duty. This decrease the output voltage Vout. Further, a shorter off period increases the on-duty. This increases the output voltage Vout. The average value of the feedback voltage Vfb is controlled to conform with the reference voltage Vref by repeatedly increasing and decreasing the on-duty. As a result, the output voltage Vout is controlled at a target voltage set by the reference voltage Vref regardless whether the ripple voltage is large or small. That is, the output voltage Vout is controlled to conform with the value set by the reference voltage regardless of the ripple of the output voltage Vout. In other words, the accuracy of the output voltage is improved regardless of differences in the ripple of the output voltage Vout.

Figure 4:
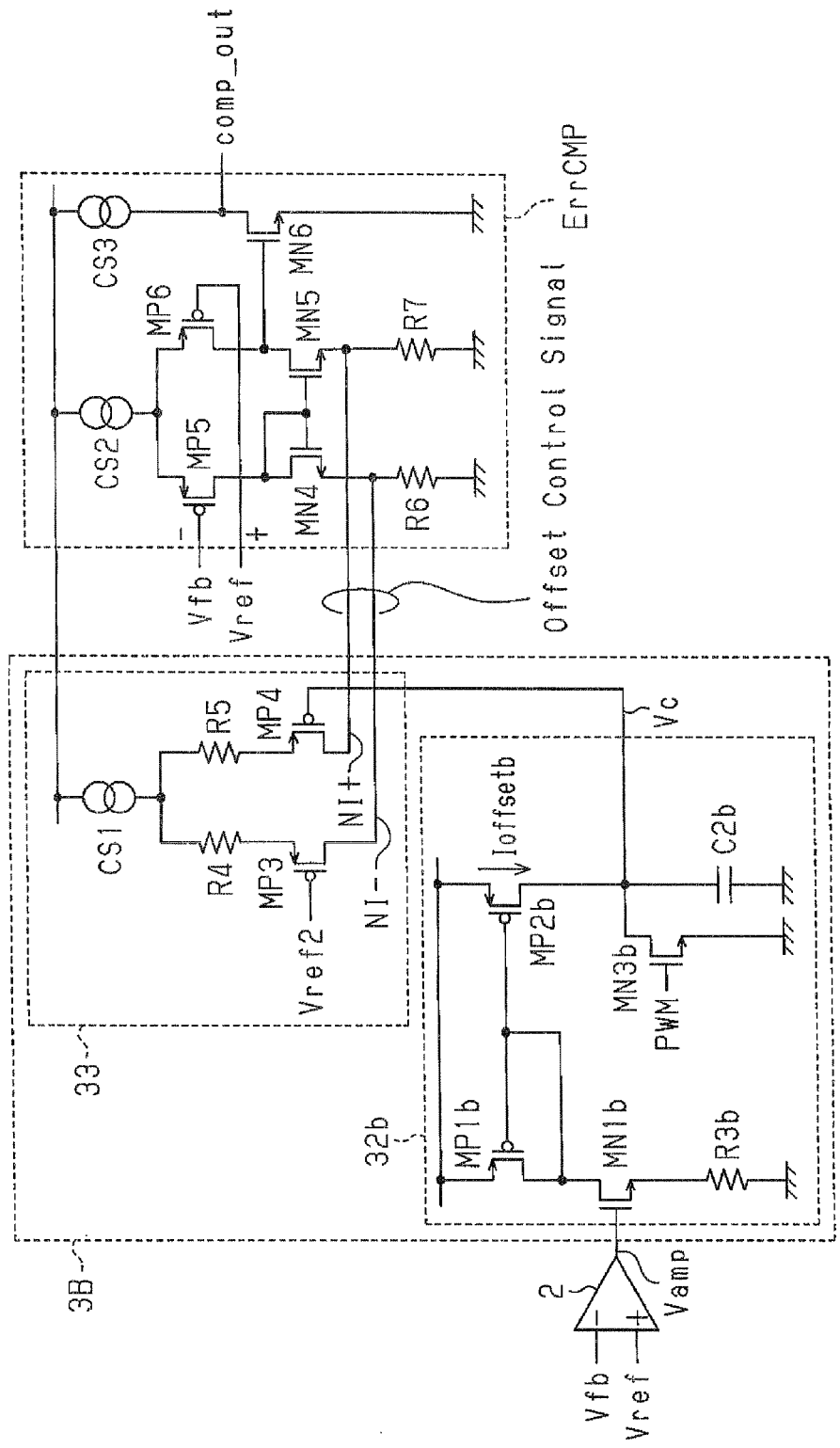
FIG. 4 is a circuit diagram of an offset control circuit 3B and a comparator ErrCMP according to a second embodiment.

A second embodiment of a switching power supply control circuit 11 will now be described with reference to FIG. 4. An offset control circuit 3B illustrated in FIG. 4 is one example of the offset control circuit 3 illustrated in FIG. 1. The comparator ErrCMP is the same as that of the first embodiment and thus will not be described.

The offset control circuit 3B includes a slope generation unit 32b and a differential pair unit 33. The differential pair unit 33 is the same as that of the first embodiment and thus will not be described.

In the slope generation unit 32b, a control signal Vamp output from an offset control amplifier 2 is input to the gate terminal of an nMOS transistor MN1b. The control signal Vamp is a control signal that corresponds to the difference between an average value of a feedback voltage Vfb and a reference voltage Vref. The offset control amplifier 2 outputs the control signal Vamp according to the feedback voltage Vfb input to an inverting input terminal and the reference voltage Vref input to a non-inverting input terminal.

A resistor R3b is coupled between the source terminal of the nMOS transistor MN1b and a ground potential. A pMOS transistor MP1b and a pMOS transistor MP2b form a current mirror circuit. The drain terminal of the pMOS transistor MP1b is coupled to the drain terminal of the nMOS transistor MN1b. The pMOS transistor MP2b supplies a capacitor C2b with a charge current Ioffsetb, which has the same value as a current flowing to the nMOS transistor MN1b or a certain multiplied value of the current flowing to the nMOS transistor MN1b.

One end of the capacitor C2b is coupled to the ground potential and the other end is coupled to the drain terminal of the pMOS transistor MP2b, the drain terminal of an nMOS transistor MN3b, and the gate terminal of a pMOS transistor MP4 in the differential pair unit 33. A voltage generated at the other end of the capacitor C2b is referred to as a slope voltage Vc. The source terminal of the nMOS transistor MN3b is coupled the ground potential, and the gate terminal of the nMOS transistor MN3b receives a control signal PWM. As a result, during a period in which the control signal PWM shifts to a high level, the capacitor C2b is discharged, and the slope voltage Vc is decreased. During a period in which the control signal PWM input to the gate terminal of the nMOS transistor MN3b shifts to a low level, the capacitor C2b is charged with the charge current Ioffsetb by the pMOS transistor MP2b. The slope voltage Vc, which is a terminal voltage of the capacitor C2b, increases at a speed corresponding to the charge current Ioffsetb.

Figure 5:
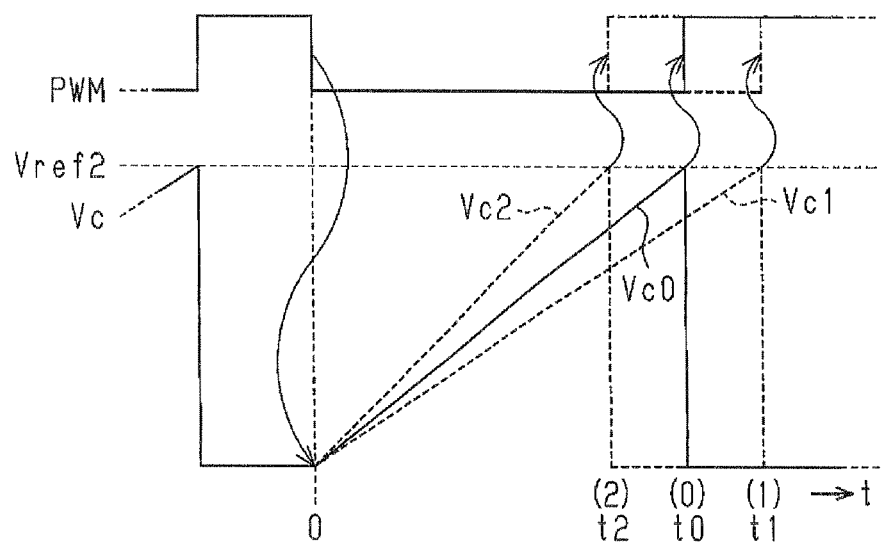
FIG. 5 is a diagram illustrating a control of a comparator ErrCMP by an offset control amplifier 2 and an offset control circuit 3B according to the second embodiment.

FIG. 5 is a diagram illustrating a control executed on the comparator ErrCMP by the offset control amplifier 2 and the offset control circuit 3B of the second embodiment. The cycle of the control signal PWM is the same as the first embodiment and thus will not be described.

When an average value of the feedback voltage Vfb is greater than the reference voltage Vref, a larger voltage difference between the feedback voltage Vfb and the reference voltage Vref decreases the voltage of the control signal Vamp output from the offset control amplifier 2.

Here, the control signal Vamp is input to the gate terminal of the nMOS transistor MN1b of the slope generation unit 32b. A decrease in the control signal Vamp decreases the current between the source and the drain of the nMOS transistor MN1b in accordance with the transconductance of the nMOS transistor MN1b. Thus, the current between the source and the drain of the nMOS transistor MN1b and the pMOS transistor MP1b decreases. This increases the voltage generated at the drain terminals of the nMOS transistor MN1b and the pMOS transistor MP1b, which are coupled to the gate terminal of the pMOS transistor MP1b. Accordingly, the voltage input to the gate of the pMOS transistor MP2b, which is coupled to the pMOS transistor MP1b, increases. This decreases a current amount of the charge current Ioffsetb, which is the current between the source and drain that flows from the pMOS transistor MP2b. The control signal Vamp is input to the gate terminal of the nMOS transistor MN1b. When the nMOS transistor MN1b is driven in a linear region, the control is executed so that the current amount of the charge current Ioffsetb decreases as the voltage of the control signal Vamp decreases.

Accordingly, when the average value of the feedback voltage Vfb is greater than the reference voltage Vref, a larger voltage difference between the feedback voltage Vfb and the reference voltage Vref decreases the current supplied to the capacitor C2b. As a result, the time until the slope voltage Vc, which is the terminal voltage of the capacitor C2b, reaches the same voltage as the reference voltage Vref2 is prolonged. When the slope voltage Vc reaches the same voltage as the reference voltage Vref2 after the control signal PWM shifts to the low level, an input offset voltage of the comparator ErrCMP becomes zero. Then, when the feedback voltage Vfb becomes less than any one of the values obtained by subtracting a negative input offset voltage that decreases as time elapses from the reference voltage Vref, the reference voltage Vref, and a value obtained by adding a positive input offset voltage which increases as time elapses to the reference voltage Vref, the control signal comp_out output by the comparator ErrCMP is switched from the low level to the high level. FIG. 5 illustrates a case in which when the input offset voltage of the comparator ErrCMP is zero, the feedback voltage Vfb becomes lower than the reference voltage Vref and the control signal comp_out output by the comparator ErrCMP is switched from the low level to the high level. The period in which the control signal PWM shifts to the high level is referred to as an off period. As a result, as the feedback voltage Vfb increases from the reference voltage Vref, the off period becomes longer.

A longer off period decreases the on-duty. This decreases the average value of the output voltage Vout and the feedback voltage Vfb.

Next, when the average value of the feedback voltage Vfb is lower than the reference voltage Vref, a larger voltage difference between the feedback voltage Vfb and the reference voltage Vref increases the voltage of the control signal Vamp output from the offset control amplifier 2.

Here, the control signal Vamp is input to the gate terminal of the nMOS transistor MN1b of the slope generation unit 32b. The higher control signal Vamp increases the current between the source and the drain of the nMOS transistor MN1b in response to the transconductance of the nMOS transistor MN1b. Accordingly, the current between the source and the drain of the nMOS transistor MN1b and the pMOS transistor MP1b increases. This decreases the voltage generated at the gate terminal of the pMOS transistor MP1b and the drain terminal, which are coupled to the nMOS transistor MN1b and the pMOS transistor MP1b. Accordingly, the voltage input to the gate terminal of the pMOS transistor MP2b, which is coupled to the pMOS transistor MP1b, decreases. Thus, the current amount of the charge current Ioffsetb, which is the current between the source and the drain that flows from the pMOS transistor MP2b, decreases. The control signal Vamp is input to the gate terminal of the nMOS transistor MN1b. When the nMOS transistor MN1b is driven in the linear region, a control is executed so that the current amount of the charge current Ioffsetb increases as the voltage of the control signal Vamp increases.

In this manner, when the average value of the feedback voltage Vfb is lower than the reference voltage Vref, a larger voltage difference between the feedback voltage Vfb and the reference voltage Vref increases the current supplied to the capacitor C2b. As a result, the time until the slope voltage Vc, which is the terminal voltage of the capacitor C2b, reaches the same voltage as the reference voltage Vref2, is shortened. When the slope voltage Vc reaches the same voltage as the reference voltage Vref2 after the control signal PWM shifts to the low level, the input offset voltage of the comparator ErrCMP becomes zero. When the feedback voltage Vfb becomes lower than any one of the values obtained by subtracting the negative input offset voltage that decreases as time elapses from the reference voltage Vref, the reference voltage Vref, or the value obtained by adding the positive input offset that increases as time elapses to the reference voltage Vref, the control signal comp_out output by the comparator ErrCMP is switched from the low level to the high level. The period until the control signal PWM shifts to the high level is referred to as the off period. As a result, as the feedback voltage Vfb increase from the reference voltage Vref, the off period becomes shorter.

Accordingly, the off period is shortened, and the on-duty increases. Accordingly, the average value of the output voltage Vout and the feedback voltage Vfb increase.

The feedback voltage Vfb and the reference voltage Vref are input to the offset control amplifier 2. The offset control amplifier 2 outputs the control signal Vamp corresponding to the difference between the average value of the feedback voltage Vfb and the reference voltage Vref. The control signal Vamp is input to the slope generation unit 32b and controls the current of the charge current Ioffsetb supplied to the capacitor C2b. The slope voltage Vc, which is the voltage at the other end of the capacitor C2b, increases at a speed corresponding to the current of the charge current Ioffsetb. Thus, the control signal Vamp controls an increase speed of the slope voltage Vc. This controls the period until the slope voltage Vc and the reference voltage Vref2 reach the same voltage after the control signal PWM shifts to the low level and the input offset voltage of the comparator ErrCMP becomes zero. As the feedback voltage Vfb increases from the reference voltage Vref, the increase speed of the slope voltage Vc decreases, and the period until the slope voltage Vc and the reference voltage Vref2 reach the same voltage and the input offset voltage of the comparator ErrCMP becomes zero is prolonged. In contrast, as the feedback voltage Vfb decreases from the reference voltage Vref, the increase speed of the slope voltage Vc increases, and the period until the slope voltage Vc and the reference voltage Vref2 reach the same voltage and the input offset voltage of the comparator ErrCMP becomes zero is shortened. After the control signal PWM shifts to the low level, when the feedback voltage Vfb becomes lower than any one of the values obtained by subtracting the negative input offset voltage that decreases as time elapses from the reference voltage Vref, the reference voltage Vref, and the value obtained by adding the positive input offset that increases as time elapses to the reference voltage Vref, the control signal comp_out output by the comparator ErrCMP is switched from the low level to the high level. The period until the control signal PWM shifts to the high level is referred to as the off period. A longer off period decreases the on-duty and decreases the output voltage Vout. Further, a shorter off period increases the on-duty and increases the output voltage Vout. The average value of the feedback voltage Vfb is controlled to conform to the reference voltage Vref by repeatedly increasing and decreasing the on-duty. As a result, the output voltage Vout is controlled at a target voltage set by the reference voltage Vref regardless of whether a ripple voltage is large or small. For example, the accuracy of the output voltage is improved regardless of a difference in the ripple of the output voltage Vout.

Figure 6:
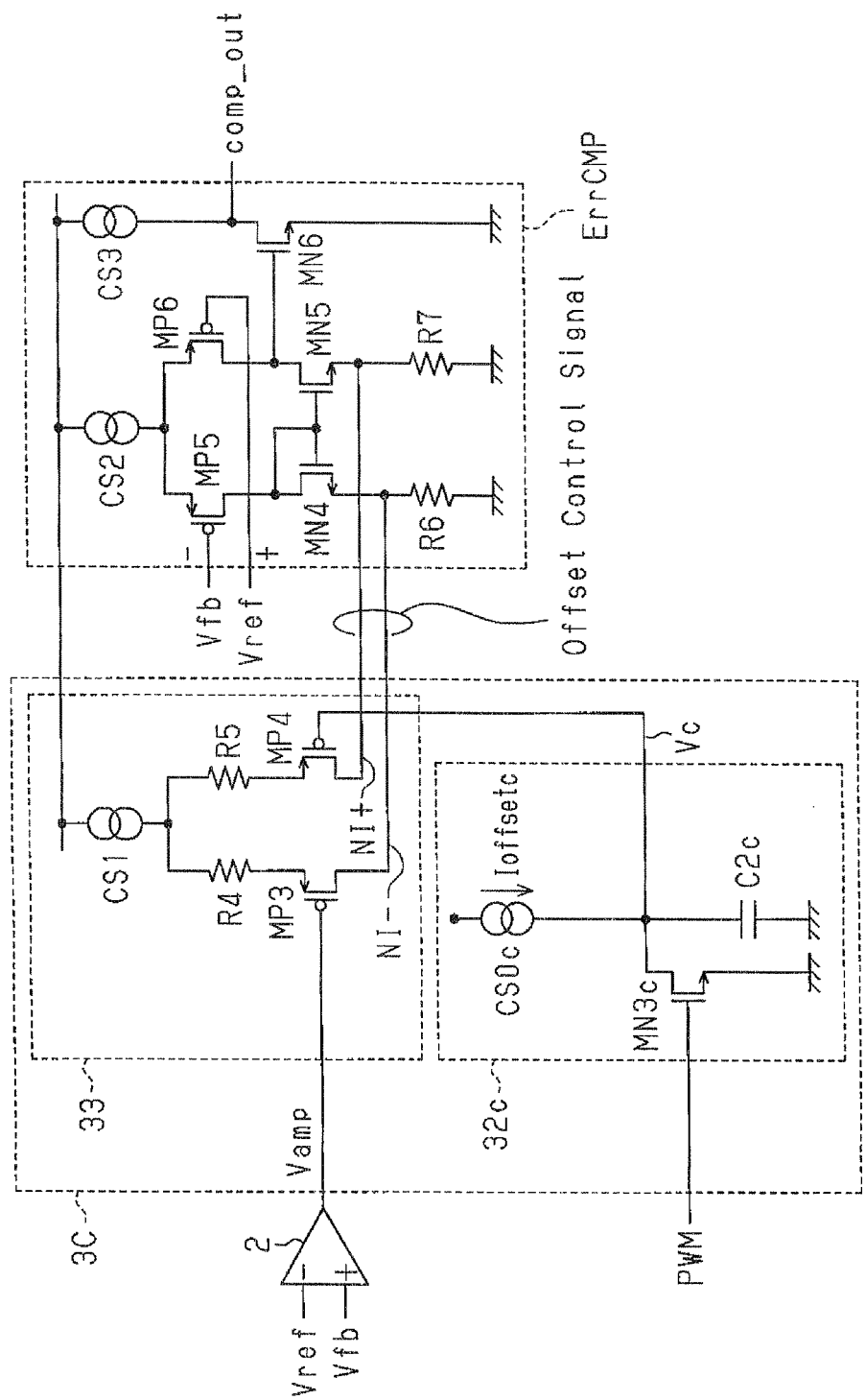
FIG. 6 is a circuit diagram of an offset control circuit 3C and a comparator ErrCMP according to a third embodiment.

A switching power supply control circuit 11 according to a third embodiment will now be described with reference to FIG. 6. An offset control circuit 3C illustrated in FIG. 6 is one example of the offset control circuit 3 of FIG. 1. The comparator ErrCMP is the same as that of the first embodiment and thus will not be described.

The offset control circuit 3C includes a slope generation unit 32c and a differential pair unit 33.

The slope generation unit 32c includes a capacitor C2c, a constant current source CS0c, and an nMOS transistor MN3c. The nMOS transistor MN3c has a source terminal coupled to a ground potential, a drain terminal coupled to the capacitor C2c and the gate terminal of a pMOS transistor MP4 of the differential pair unit 33, and a gate terminal that receives a control signal PWM.

The capacitor C2c has one end coupled to the ground potential and another end coupled to the drain terminal of the nMOS transistor MN3c and the gate terminal of the pMOS transistor MP4 of the differential pair unit 33. A voltage generated at the other end of the capacitor C2c is referred to as a slope voltage Vc. As a result, the capacitor C2c is discharged during a period in which the control signal PWM shifts to a high level. This decreases the slope voltage Vc, which is the voltage at the other end of the capacitor C2c. The capacitor C2c is charged with a charge current Ioffsetc by the constant current source CS0c during a period in which the control signal PWM shifts to a low level, and the slope voltage Vc increases at a speed that is in accordance with the charge current Ioffsetc.

The differential pair unit 33 differs from those of the first embodiment and the second embodiment in that a control signal Vamp output from an offset control amplifier 2 is input to the gate terminal of the pMOS transistor MP3.

Figure 7:
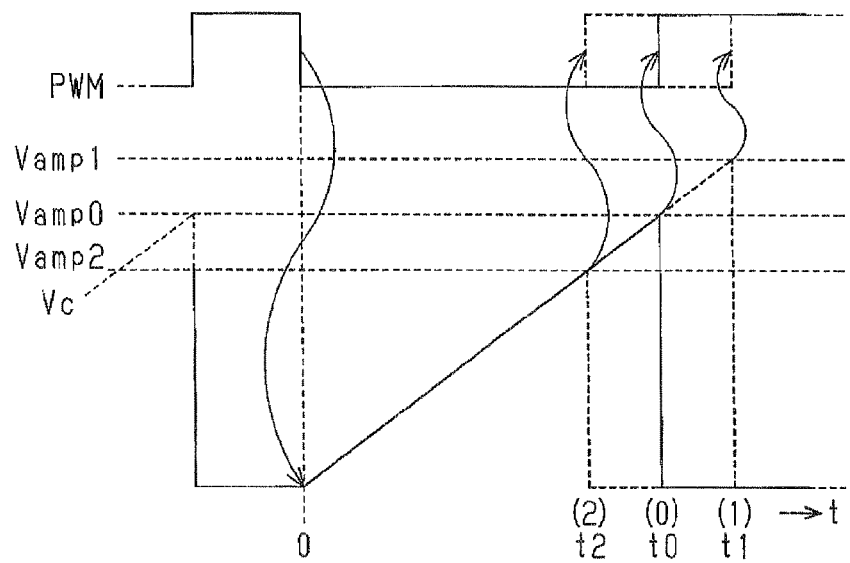
FIG. 7 is a diagram illustrating a control of the comparator ErrCMP by an offset control amplifier 2 and the offset control circuit 3C according to the third embodiment.

FIG. 7 is a view illustrating the control of the comparator ErrCMP executed by the offset control amplifier 2 and the offset control circuit 3C of the third embodiment. The cycle of the control signal MWP is the same as the first embodiment and thus will not be described.

The control signal Vamp corresponds to the difference between an average value of a feedback voltage Vfb and a reference voltage Vref. The offset control amplifier 2, which outputs the control signal Vamp, includes an inverting input terminal to which the reference voltage Vref is input and a non-inverting input terminal to which the feedback voltage Vfb is input. The control signal Vamp is input to the gate terminal of the pMOS transistor MP3 of the differential pair unit 33. The slope voltage Vc is coupled to the gate terminal of the pMOS transistor MP4 of the differential pair unit 33.

When the average value of the feedback voltage Vfb is greater than the reference voltage Vref, an increase in the voltage difference between the feedback voltage Vfb and the reference voltage Vref increases the voltage of the control signal Vamp output from the offset control amplifier 2.

A higher voltage of the control signal Vamp prolongs the time until the slope voltage Vc, which is the voltage at the other end of the capacitor C2c that increases at a speed corresponding to the current of the charge current Ioffsetc, reaches the same voltage as the control signal Vamp after the control signal PWM shifts to the low level. When the slope voltage Vc reaches the same voltage as the voltage of the control signal Vamp, an input offset voltage of the comparator ErrCMP becomes zero. Then, when the feedback voltage Vfb becomes lower than any one of the values obtained by subtracting a negative input offset voltage, which decreases as time elapses from the reference voltage Vref, the reference voltage Vref, and a value obtained by adding a positive input offset voltage, which increases as time elapses, to the reference voltage Vref, the control signal comp_out that is output by the comparator ErrCMP is shifted from the low level to the high level. FIG. 7 illustrates a case when the input offset voltage of the comparator ErrCMP is zero in which the feedback voltage Vfb becomes lower than the reference voltage Vref and the control signal comp_out output by the comparator ErrCMP is shifted from the low level to the high level. A period until the control signal PWM shifts to the high level is referred to as an off period. As a result, as the feedback voltage Vfb increases from the reference voltage Vref, the off period becomes longer.

In this manner, a longer off period decreases the duty-cycle. Accordingly, a longer off period decreases the average value of the output voltage Vout and the feedback voltage Vfb.

Next, when the average value of the feedback voltage Vfb is less than the reference voltage Vref, a larger voltage difference between the feedback voltage Vfb and the reference voltage Vref causes the offset control amplifier 2 to decrease the output voltage of the voltage of the control signal Vamp.

A lower voltage of the control signal Vamp shortens the time until the slope voltage Vc, which is the voltage at the other end of the capacitor C2c that increases at the speed corresponding to the charge current Ioffsetc, reaches the same voltage as the control signal Vamp after the control signal PWM shifts to the low level. After the control signal PWM shifts to the low level, when the feedback voltage Vfb becomes lower than any one of the values obtained by subtracting the negative input offset voltage, which decreases as time elapses, from the reference voltage Vref, the reference voltage Vref, and the value obtained by adding the positive input offset, which increases as time elapses, to the reference voltage Vref, the control signal comp_out output by the comparator ErrCMP is shifted from the low level to the high level. The period until the control signal PWM shifts to the high level is referred to as the off period. As a result, as the feedback voltage Vfb increases from the reference voltage Vref, the off period is shortened.

In this manner, a shorter off period increases the duty-cycle. Thus, a shorter off period increases the average value of the output voltage Vout and the feedback voltage Vfb.

The feedback voltage Vfb and the reference voltage Vref are input to the offset control amplifier 2. The offset control amplifier 2 outputs the control signal Vamp in accordance with the difference between the average value of the feedback voltage Vfb and the reference voltage Vref. The control signal Vamp is input to the gate terminal of the pMOS transistor MP3 in the differential pair unit 33, and the slope voltage Vc is input to the gate terminal of the pMOS transistor MP4. The time until the slope voltage Vc, which increases at a constant speed, and the control signal Vamp reach the same voltage is controlled in accordance with the voltage value of the control signal Vamp. As the feedback voltage Vfb increases from the reference voltage Vref, the voltage of the control signal Vamp increases, and the period until the slope voltage Vc and the control signal Vamp reach the same voltage and the input offset voltage of the comparator ErrCMP becomes zero is prolonged. In contrast, as the feedback voltage Vfb decreases from the reference voltage Vref, the voltage of the control signal Vamp decreases, and the period until the slope voltage Vc and the control signal Vamp reach the same voltage and the input offset voltage of the comparator ErrCMP becomes zero is shortened. After the control signal PWM shifts to the low level, when the slope voltage Vc and the control signal Vamp reach the same voltage and the feedback voltage Vfb becomes less than any one of the values obtained by subtracting the negative input offset voltage, which decreases as time elapses, from the reference voltage Vref, the reference voltage Vref, and the value obtained by adding the positive input offset, which increases as time elapses, to the reference voltage Vref, the control signal comp_out that is output by the comparator ErrCMP is shifted from the low level to the high level. The period until the control signal PWM shifts to the high level is referred to as the off period. A longer off period decreases the on-duty and the output voltage Vout. Further, a shorter off period increases the on-duty and the output voltage Vout. A control is executed so that the average value of the feedback voltage Vfb conforms to the reference voltage Vref by repeatedly increasing and decreasing the on-duty. As a result, the output voltage Vout is controlled to a target voltage set by the reference voltage Vref regardless of whether a ripple voltage is large or small. For example, the accuracy of the output voltage can be improved regardless of differences in the ripple of the output voltage Vout.

Figure 8:
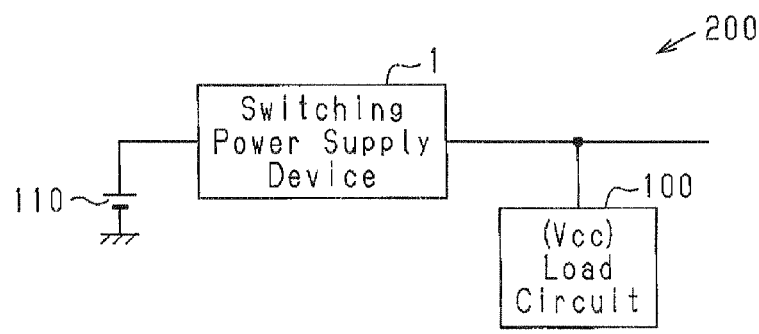
FIG. 8 is a block diagram illustrating electronic device on which a switching power supply device 1 is mounted.

FIG. 8 is a block diagram illustrating an electronic device 200 including the switching power supply device 1. Examples of the electronic device 200 include, for example, portable equipment, a personal computer, a cellular phone, and a digital camera. The electronic device 200 includes a battery 110, the switching power supply device 1, and a load circuit 100. The battery 110 is, for example, a lithium ion battery. Alternatively, the battery 110 is formed by a plurality of lithium ion battery units coupled in series. The load circuit 100 is, for example, an analog circuit, a digital circuit, a microprocessor, a light emitting element, a display device, a sensor, or the like. The switching power supply device 1 or 1*d* receives output voltage from the battery 110, converts the output voltage to a certain voltage, and supplies power supply voltage to the load circuit 100.

As described above in detail, in the first embodiment of the present invention, the comparator ErrCMP receives the feedback voltage Vfb and the reference voltage Vref. When the feedback voltage Vfb input to the comparator ErrCMP becomes lower than any one of the values obtained by subtracting the negative input offset voltage, which decreases as time elapses, from the reference voltage Vref, the reference voltage Vref, and the value obtained by adding the positive input offset voltage, which increases as time elapses, to the reference voltage Vref, the control signal comp_out, which is the output signal of the comparator ErrCMP, is switched from the low level to the high level. Then, the control signal PWM shifts to the high level, and a switching cycle of the switching power supply device 1 starts. The feedback voltage Vfb is compared with the reference voltage Vref, to which the negative input offset voltage or the positive input offset voltage that varies as time elapses is applied. As a result, the comparator ErrCMP performs a comparison to which a change speed of an offset is reflected. Even when the change in the feedback voltage Vfb is small due to a ripple voltage of the output voltage Vout, the comparison is performed by emphasizing a periodic change of the voltage. Accordingly, the comparator ErrCMP responds more quickly, and high-speed response operations are ensured in the comparator type switching power supply device 1.

Further, the offset control amplifier 2 controls a delay period until the control signal de_out shifts to the low level after the control signal PWM shifts to the low level in response to the difference between the average value of the feedback voltage Vfb and the reference voltage Vref. As the feedback voltage Vfb increases from the reference voltage Vref, the delay period becomes longer. In contrast, as the feedback voltage Vfb decreases from the reference voltage Vref, the delay period becomes shorter. After the delay time elapses from when the control signal PWM shifts to the low level, the control signal comp_out, which is the output signal of the comparator ErrCMP, is switched from the low level to the high level, and the control signal PWM shifts to the high level. When the period is referred to as the off period, a longer off period decreases the on-duty and the output voltage Vout. Further, a shorter off period increases the on-duty and the output voltage Vout. A control is executed so that the average value of the feedback voltage Vfb conforms to the reference voltage Vref by repeatedly increasing and decreasing the on-duty. As a result, the output voltage Vout is controlled to a target voltage set by the reference voltage Vref regardless of whether a ripple voltage is large or small. That is, the output voltage Vout is controlled so as to conform to the value set by the reference voltage Vref regardless of the ripple in the output voltage Vout. Thus, the accuracy of the output voltage is improved regardless of differences in the ripple of the output voltage Vout.

Further, in a second embodiment of the invention, the offset control amplifier 2 controls the increase speed of the slope voltage Vc in response to the difference between the average value of the feedback voltage Vfb and the reference voltage Vref. This controls the period until the slope voltage Vc and the reference voltage Vref2 reach the same voltage after the control signal PWM shifts to the low level and the input offset voltage of the comparator ErrCMP becomes zero. As the feedback voltage Vfb increases from the reference voltage Vref, the increase speed of the slope voltage Vc decreases, and the period until the input offset voltage of the comparator ErrCMP becomes zero is prolonged. In contrast, as the feedback voltage Vfb decreases from the reference voltage Vref, the increase speed of the slope voltage Vc increases, and the period until the input offset voltage of the comparator ErrCMP becomes zero is shortened. The off period is controlled by controlling the period until the input offset voltage of the comparator ErrCMP becomes zero. Other operations and advantages are the same as the first embodiment.

In a third embodiment of the invention, the offset control amplifier 2 outputs the control signal Vamp corresponding to the difference between the average value of the feedback voltage Vfb and the reference voltage Vref. The time until the slope voltage Vc, which increases at a constant speed, and the control signal Vamp reach the same voltage is controlled in accordance with the voltage value of the control signal Vamp. As the feedback voltage Vfb increases from the reference voltage Vref, the period until the input offset voltage of the comparator ErrCMP becomes zero is prolonged. In contrast, as the feedback voltage Vfb decreases from the reference voltage Vref, the period until the input offset voltage of the comparator ErrCMP becomes zero is shortened. The off period is controlled by controlling the period until the input offset voltage of the comparator ErrCMP becomes zero. Other operations and advantages are the same as the first embodiment.

Figure 9:
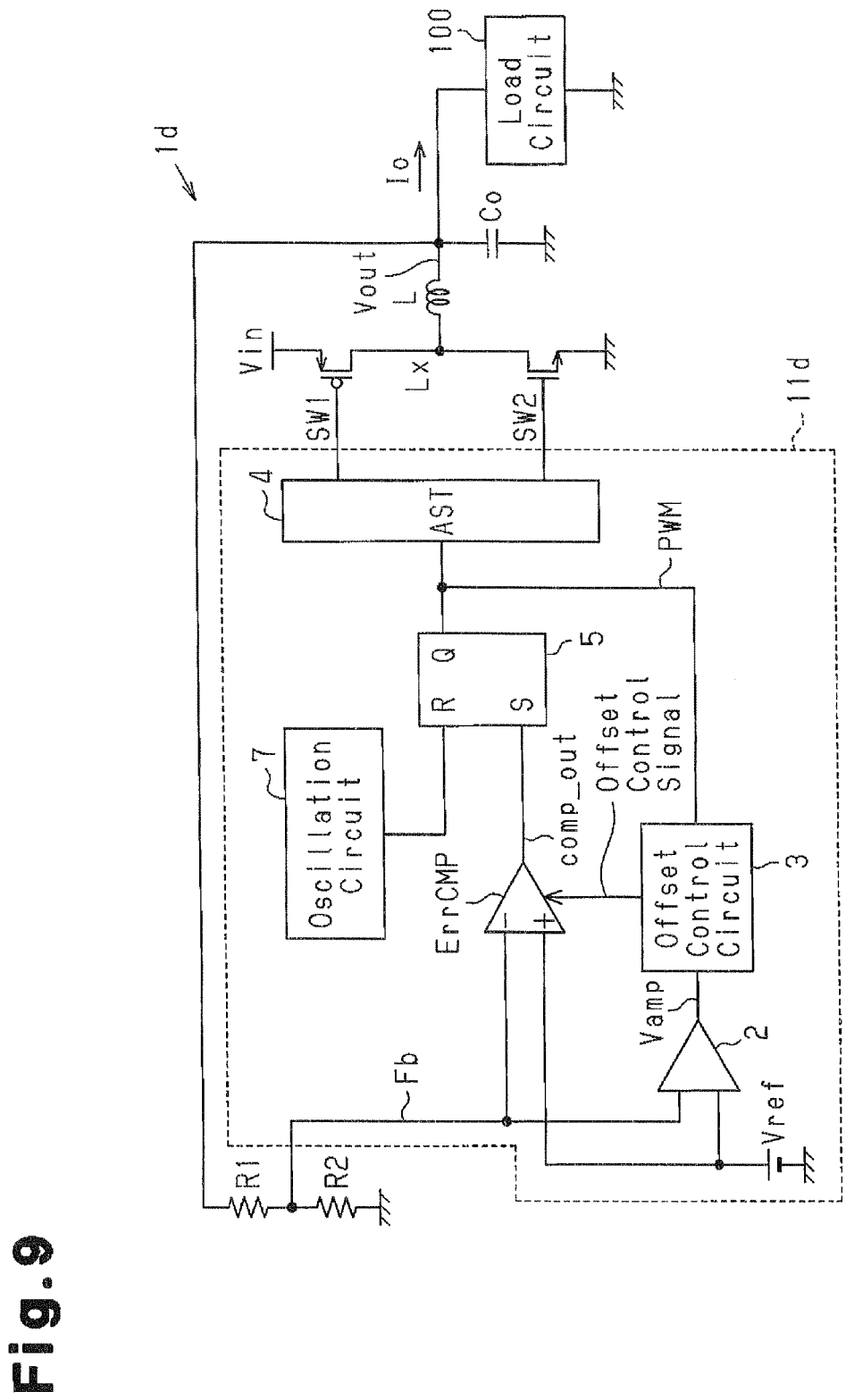
FIG. 9 is a block diagram of a switching power supply device common to embodiments according to a fixed frequency system.

It should be apparent to those skilled in the art that the present invention may be embodied in many other specific forms without departing from the spirit or scope of the invention. Particularly, it should be understood that the present invention may be embodied in the following forms. The present invention may also be applied in the same manner to a frequency-fixed comparator type system. For example, as illustrated in FIG. 9, the on period generation circuit 6 illustrated in FIG. 1 may be replaced by an oscillation circuit 7, which provides an oscillation signal to the reset terminal R of the RS flip-flop 5.

The constant current source CS0a of the first embodiment and the constant current source CS0c of the third embodiment may be replaced by a current source that generates current in accordance with a coil current.

In the first embodiment and the second embodiment, the differential pair unit 33 may be replaced by a circuit from which the resistor R4 and the pMOS transistor MP3 are eliminated and which includes the constant current source CS1, the resistor R5, and the pMOS transistor MP4. For example, the source terminal of the pMOS transistor MP4 is coupled to the constant current source CS1 via the resistor R4, the gate terminal of the pMOS transistor MP4 receives the slope voltage Vc, and the drain terminal of the pMOS transistor MP4 is coupled to the node NI+. The differential pair unit 33 supplies the offset control current Io+ to the comparator ErrCMP via the node NI+. As a result, the input offset voltage of the comparator ErrCMP is controlled by a current of the offset control current Io+.

The switching power supply control circuit 11 is an example of a power supply controller, the feedback voltage Vfb is an example of a feedback voltage, the comparator ErrCMP is an example of a comparator, the slope generation units 32a, 32b, and 32c and the differential pair unit 33 are examples of an offset application circuit, the offset control amplifier 2 is an example of an amplifier, the delay generation unit 31a is an example of a delay circuit, the slope generation units 32a, 32b, 32c are examples of a charge circuit, the reference voltage Vref2 or the control voltage Vamp are an example of a certain voltage, the differential pair unit 33 is an example of a differential pair, and the switching power supply devices 1 and 1d are an example of a power supply.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A comparator type power supply controller that controls an output voltage, the power supply controller comprising:
   a comparator that compares a feedback voltage, which corresponds to the output voltage, with a reference voltage and instructs power supply when the feedback voltage decreases from the reference voltage;
   an offset application circuit coupled to the comparator to control an input offset voltage of the comparator, wherein the offset application circuit decreases the input offset voltage as time elapses when the feedback voltage becomes lower than the reference voltage after the power supply ends; and
   an amplifier that amplifies a voltage difference of the feedback voltage and the reference voltage;
   wherein the offset application circuit increases a change speed of the input offset voltage as the voltage difference increases in accordance with an output voltage of the amplifier.

2. The power supply controller according to claim 1, wherein the offset application circuit includes a delay circuit that delays a change start timing of the input offset voltage in accordance with an output voltage of the amplifier.

3. The power supply controller according to claim 2, wherein the offset application circuit includes:
   a charge circuit that starts charging in response to a change start command of the input offset voltage supplied from the delay circuit; and
   a differential pair that receives an output voltage of the charge circuit and a certain voltage and generates divided currents, wherein the divided currents flow from the differential pair to a load of the comparator.

4. The power supply controller according to claim 1, wherein
   the offset application circuit includes a charge circuit having a charge current controlled in accordance with the output voltage of the amplifier, and
   a change in the input offset voltage is adjusted in accordance with an output voltage of the charge circuit.

5. The power supply controller according to claim 4, wherein the offset application circuit includes a differential pair that receives the output voltage of the charge circuit and a certain voltage and generates divided currents, wherein the divided currents flow from the differential pair to a load of the comparator.

6. The power supply controller according to claim 1, wherein the offset application circuit includes:
   a charge circuit that starts charging when the power supply ends; and
   a differential pair that receives an output voltage of the charge circuit and the output voltage of the amplifier and generates divided currents;
   wherein the divided currents flow from the differential pair to a load of the comparator.

7. An electronic device comprising:
   a comparator type power supply; and
   a load circuit supplied with power from the power supply, wherein the power supply includes:
      a comparator that compares a feedback voltage, which corresponds to an output voltage of the power supply, with a reference voltage, wherein the comparator instructs power supply when the feedback voltage decreases from the reference voltage;
      an offset application circuit coupled to the comparator, wherein the offset application circuit controls an input offset voltage of the comparator, and the offset application circuit decreases the input offset voltage as time elapses when the feedback voltage becomes lower than the reference voltage after the power supply ends; and
      an amplifier that amplifies a voltage difference of the feedback voltage and the reference voltage;
      wherein the offset application circuit increases a change speed of the input offset voltage as the voltage difference increases in accordance with an output voltage of the amplifier.

8. A method for controlling a comparator type power supply that controls an output voltage, the method comprising:
   comparing a feedback voltage, which corresponds to the output voltage, with a reference voltage;
   instructing power supply when the feedback voltage decreases from the reference voltage;
   decreasing an input offset voltage of the comparator of the power supply as time elapses when the feedback voltage becomes lower than the reference voltage after the power supply ends; and
   increasing a change speed of the input offset voltage as a voltage difference of the feedback voltage and the reference voltage increases.

9. A comparator type power supply controller that controls an output voltage, the power supply controller comprising:
   a comparator that compares a feedback voltage, which corresponds to the output voltage, with a reference voltage;
   an offset control circuit coupled to the comparator, wherein the offset control circuit controls an input offset voltage of the comparator; and
   an amplifier that amplifies a voltage difference of the feedback voltage and the reference voltage and supplies the amplified voltage difference to the offset control circuit;
   wherein the offset control circuit includes:
      a slope generation unit including a capacitor charged by a charge current; and
      a differential pair that receives a charge voltage of the capacitor and a certain voltage and generates divided currents, wherein
         the divided currents flow from the differential pair to a load of the comparator, and
         the slope generation unit changes a charge profile of the charge voltage by delaying a charge start timing of the capacitor or changing an increase speed of a charge voltage of the capacitor in accordance with the amplified voltage difference.

* * * * *